United States Patent [19]

O'Mahoney, Jr.

[11] 4,020,038

[45] Apr. 26, 1977

[54] PAINTABLE RUBBER COMPOSITION AND PRODUCTS PREPARED THEREFROM

[75] Inventor: Joseph F. O'Mahoney, Jr., Stow, Ohio

[73] Assignee: The Goodyear Tire & Rubber Company, Akron, Ohio

[22] Filed: Sept. 19, 1975

[21] Appl. No.: 615,137

[52] U.S. Cl. .......................... 260/42.33; 260/42.21; 260/42.24; 260/889; 260/894
[51] Int. Cl.² .......................................... C08K 3/06
[58] Field of Search ............... 260/889, 894, 42.24, 260/42.33, 42.21

[56] References Cited

UNITED STATES PATENTS

| 2,677,674 | 5/1954 | Dzly | 260/80.7 |
|---|---|---|---|
| 3,445,543 | 5/1969 | Gruver | 260/889 |

*Primary Examiner*—J. Ziegler
*Attorney, Agent, or Firm*—F. W. Brunner; J. A. Rozmajzl

[57] ABSTRACT

A paintable rubber composition of SBR rubber and EPDM rubber, containing, as a stiffening agent, a high styrene resin of butadiene and styrene. This rubber composition can be used in molded and extruded products such as sight shields, automotive facia, fender liners and automotive door panels.

9 Claims, No Drawings

PAINTABLE RUBBER COMPOSITION AND PRODUCTS PREPARED THEREFROM

This invention relates to a rubber composition which can be used in the manufacture of molded and extruded products including automotive products such as sight shields, automotive facia, fender liners and automotive door panels.

Polymeric compositions have been used as sight shields (see U.S. Pat. No. 3,873,348) and automotive facia. Facia comprises the front and rear vertical components of an automobile between bumper and engine in front and bumper and trunk in the rear. In the front the configuration surrounds the headlights and parking lights and has spacing to permit a flow of air to the radiator and the engine compartment. In the rear the configuration surrounds the tail lights, mates with the rear fender and provides an enclosure for the trunk.

These automotive parts are normally painted (U.S. Pat. No. 3,764,370), frequently using an ultra violet (UV), benzophenone pretreatment. It is desirable that these parts possess a high modulus and high hardness and yet process easily during molding and/or extrusion steps without undue scorching. It is also important that these parts be easily paintable. In addition, it is desirable that the paint adhere to the substrate of the part even when the part is subjected to moisture, particularly salt water such as that which is formed when streets are "salted" after heavy snows.

It is an object of the present invention to provide a new rubbery composition to be used in molded and extruded goods, particularly automotive parts such as sight shields and automotive facia. It is also an object to provide a vulcanized rubbery composition which is flexible yet possesses a high modulus, high hardness and promotes effective adhesion between itself and coatings thereon. It is an additional object of the present invention to provide a composition which, as a substrate, is easily paintable and will weather well, even if the paint is removed from its surface. It is a further object of the present invention to provide a composition which will extrude and mold easily and in addition be relatively scorch resistant. It is another object of the present invention to provide sight shields with reduced metal reinforcement.

The objects of the present invention are accomplished by fabricating sulfur vulcanized molded and extruded goods such as sight shields and automotive facia from a rubbery composition comprising (A) 50 to 80 (preferably 55 to 70) parts by weight of a rubbery butadiene/styrene copolymer (SBR), (B) 20 to 50 (preferably 30 to 45) parts by weight of an ethylene/propylene terpolymer (EPDM) and (C) 15 to 50 (preferably 25 to 35) parts by weight of a butadiene/styrene resin, all parts being parts by weight per 100 parts of SBR plus EPDM.

The SBR rubber has a bound styrene content from 5 to 50 weight percent, preferably 15 to 30 percent. The butadiene/styrene resin has a bound styrene content of from 75 to 90 weight percent. Both the rubber and the resin can be prepared by conventional free radical emulsion polymerization techniques, although the method of preparation is not critical to the practice of the present invention.

Various nonconjugated dienes can be used to prepare the rubbery terpolymers of ethylene, propylene and a diene. Representative examples of the nonconjugated dienes are aliphatic dienes having from 6 to 22 carbon atoms such as 1,4-hexadiene, 1,5-heptadiene, 1,6-octadiene, 6-methyl-1,5-heptadiene, 7-methyl-1,6-octadiene, 11-ethyl-1,11-tridecadiene, 9-ethyl-1,9-undecadiene, 7-ethyl-1,7-nonadiene, 8-propyl-1,8-undecadiene, 8-ethyl-1,8-decadiene, 10-ethyl-1,9-dodecadiene, 12-ethyl-1,12-tetradecadiene, 13-n-butyl-1,12-tridecadiene and 15-ethyl-1,15-heptadecadiene and cycloaliphatic dienes and substituted cycloaliphatic dienes such as dicyclopentadiene and 5-alkenyl-substituted-2-norbornenes such as 5-methylene-2-norbornene, 5-ethylidene-2-norbornene, and 2-alkyl-2,5-norbornadienes such as 2-methyl-2,5-norbornadiene. The generally preferred nonconjugated dienes are 1,4-hexadiene, dicyclopentadiene, 5-methylene-2-norbornene and 5-ethylidene-2-norbornene. Usually such terpolymers contain from about 20 to about 80 weight percent units derived from ethylene, from about 20 to about 80 weight percent units derived from propylene and from about 1 to about 15 weight percent units derived from the diene.

The method of combining the SBR, EPDM and resin is not crictical to the practice of the present invention, but better ozone and weather resistance are obtained when the SBR, EPDM and resin are first blended together with subsequent addition of other ingredients following normal procedures for incorporating rubber compounding ingredients. The components can be mill mixed or Banbury mixed following these precautions. In addition, latices of the SBR and the resin can be mixed and co-coagulated, the resultant polymeric composition being subsequently combined with the EPDM.

To prepare the molded or extruded products, conventional methods of shaping and vulcanizing the product from the polymeric composition can be used. For example, the polymeric composition containing elemental sulfur and other compounding ingredients can be compression molded or injected molded at conventional vulcanization temperatures or extruded and vulcanized in open steam.

The unvulcanized polymeric composition always contains conventional amounts of elemental sulfur (normally, but not limited to, 2.0 to 4.0 parts by weight per 100 parts by weight of SBR plus EPDM). Normally the polymeric composition is also compounded with carbon black in reinforcing amounts, for example, but not limited to, from 70 to 100 parts by weight per 100 parts by weight of SBR plus EPDM. Conventional additives can be used such as sulfur donor compounds, e.g., N-(2-morpholinodithio)benzothiazole; other conventional accelerators, e.g., N-(2-morpholinothio)benzothiazole; zinc oxide; stearic acid; antioxidants; retarders; etc.

The sight shields and facia prepared from the polymeric composition can be painted by any of the conventional methods such as that described in U.S. Pat. No. 3,764,370. Conventional sulfur vulcanization times and temperatures can be used.

Because of the high modulus and hardness of the compositions of the present invention after sulfur vulcanization, the metal reinforcement used in sight shields can be reduced and in some cases totally eliminated without sacrificing processing and physical properties. In addition the elimination of metal reinforcement reduces the weight of the automotive part. Such an advantage is in keeping with efforts to reduce the total weight of the automobile and thereby reduce energy requirements.

Compositions of the present invention are easily extruded and molded and are highly resistant to scorch. On sulfur vulcanization they remain flexible but possess a high modulus and hardness. On being painted as vulcanized substrates, the adhesion between the paint and the substrate is satisfactory and particularly outstanding when the painted substrate is subjected to severe weathering, particularly in the presence of water and most particularly in the presence of salt water. The vulcanized compositions are also flexible and impact resistant. Should the paint be totally or partially removed from the surface of the polymeric substrate, the substrate possesses a high resistance to severe weathering.

Examples 1, 2, 3 and 4 were prepared using the following formulation.

|  | Parts by Weight |
|---|---|
| Low Mooney SBR[1] | 60.00 |
| EDPM[2] | 40.00 |
| Resin[3] | 25.00 |
| Zinc oxide | 5.00 |
| Stearic acid | 2.00 |
| Polymeric hindered phenol | 0.50 |
| FEF black | 80.00 |
| Processing oil | 10.00 |
| N-(2-morpholinothio)benzothiazole | 1.50 |
| N-(cyclohexylthio)phthalimide | 0.20 |
| Sulfur | 3.00 |

[1]Butadiene/styrene copolymer having an ML-4 of 20–30 and a bound styrene content of about 23 weight percent.
[2]Terpolymer of ethylene, propylene and ethylidene norbornene.
[3]The resin was varied as shown in Table 1.

Different resins were used and the compositions vulcanized. Various tests were run. The results are listed in Table I.

Example 1 is a composition of the present invention. Examples 2 to 4 are not.

superior stress-strain properties with superior processing and molding characteristics as indicated by the Olsen Flow, Milling and Plasticity data. The compression set was also superior.

The product of Example 1 was painted with a polyurethane paint and subjected to various tests involving flex, temperature change, impact, and exposure to water and salt water to evaluate the bond between the substrate and the paint. The painted article passed all tests.

The Mooney of the butaidene/styrene rubber is preferably 20 to 40 and most preferably 20 to 30. By Mooney is meant the ML-4 value, i.e., ASTM D-1646.

An alternate method of preparing the composition involves combining the EPDM with the rubbery SBR and a rubbery SBR/high styrene resin blend, said blend being prepared by co-coagulating a blend of the latices of the SBR rubber and high styrene resin. Again the method by which the final composition is prepared is not critical to the practice of the present invention.

While certain representative embodiments and details have been shown for the purpose of illustrating the invention, it will be apparent to those skilled in this art that various changes and modifications may be made therein without departing from the spirit or scope of the invention.

I claim:

1. A polymeric composition suitable for use in sight shields and automotive facia comprising (A) 50 to 80 parts by weight of a rubbery butadiene/styrene copolymer, (B) 20 to 50 parts by weight of an ethylene/propylene/nonconjugated diene terpolymer and (C) 15 to 50 parts by weight of a butadiene/styrene resin, all parts being by weight per 100 parts by weight of (A) plus (B) wherein the rubbery butadiene/styrene copolymer has a bound styrene content of from 5 to 50 weight percent and the butadiene/styrene resin has a bound styrene content of from 75 to 90 weight percent.

Table I

|  |  | Examples |  |  |  |
|---|---|---|---|---|---|
|  |  | 1 | 2 | 3 | 4 |
|  |  |  | Resin |  |  |
|  |  | B/S Resin[4] | ABS Resin[5] | S/A | ABS |
| Rheometer 12'/350° F |  |  |  |  |  |
|  | max | 86 | 82 | 85 | 82 |
|  | min | 15 | 14 | 17 | 17 |
|  | $t_2$ | 3.3 | 2.8 | 3.0 | 2.9 |
|  | $t_{90}$ | 8.5 | 6.6 | 7.5 | 7.1 |
| Scorch | $M_m$ | 27 | 24.5 | 28 | 31 |
| SR 290° F | $T_3$ | 21 | 14 | 17 | 15 |
| 15'/330° F |  |  |  |  |  |
|  | Tensile (psi) | 2550 | 2025 | 1975 | 2200 |
|  | Elong. (%) | 240 | 140 | 160 | 170 |
|  | 100 mod. (psi) | 1425 | 1525 | 1425 | 1475 |
|  | Hardness A/D | 90/41 | 87/40 | 88/40 | 87/39 |
| Olsen Flow 1 min 250° F 300 psi |  | .95 | 1.05 | .68 | .68 |
| Ozone 7 days 100° F 50 pphm bent loop |  | no cracking |  |  |  |
| E-731 Fadeometer 16–24 hrs |  | no staining |  |  |  |
| Milling |  | ok | medium bagging | very bad bagging | bad bagging |
| Plasticity |  | 45 | 65 | 87 | 73 |
| Brittle Point ° C |  | −57 | −52 | −51 | −49 |
| ° F |  | −71 | −62 | −60 | −56 |
| Tear ASTM die B |  | 223 | 194 | 154 | 169 |
| die C |  | 175 | 164 | 148 | 208 |
| Compression set % |  | 16.3 | 21.5 | 21.7 | 28.5 |
| Flexural Modulus D790 |  | 12907 | 11566 | 11440 |  |
| Youngs Modulus D797 |  | 11500 | 9270 | 12330 | 9680 |

[4]Butadiene/styrene copolymer containing about 23 percent bound styrene.
[5](26.5/15/58.5) acrylonitrile/butadiene/styrene.

The Example I composition exhibited overall properties superior to the other compositions. It combined 2. The polymeric composition of claim 1 wherein said composition contains 70 to 100 parts by weight of carbon black and 2.5 to 4.0 parts by weight of sulfur.

3. The polymeric composition of claim 1 comprising 55 to 70 parts of (A), 30 to 45 parts of (B) and 25 to 35 parts of (C).

4. The vulcanized form of the polymeric composition of claim 2.

5. The polymeric composition of claim 1 wherein the rubbery butadiene/styrene copolymer has an ML-4 value of from 20 to 40.

6. The polymeric composition of claim 1 wherein the rubbery butadiene/styrene copolymer has an ML-4 value of from 20 to 30.

7. The vulcanized polymeric composition of claim 4 wherein said composition is in the form of a sight shield, automotive facia, a fender liner or an automotive door panel.

8. The vulcanized polymeric composition of claim 4 wherein said composition is in the form of a sight shield or automotive facia.

9. The vulcanized polymeric composition of claim 4 wherein said composition is in the form of a sight shield.

* * * * *